(12) United States Patent
Izutsu et al.

(10) Patent No.: US 6,355,084 B1
(45) Date of Patent: Mar. 12, 2002

(54) METHOD FOR PRODUCING A FERTILIZER FROM GAS CONTAINING SULFUR OXIDES

(75) Inventors: Masahiro Izutsu, Kawasaki; Akiko Yokoyama, Yokohama; Yoshitaka Iizuka, Kawasaki; Ryoji Suzuki, Kanagawa, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/308,254
(22) PCT Filed: Nov. 25, 1997
(86) PCT No.: PCT/JP97/04285
§ 371 Date: Jul. 13, 1999
§ 102(e) Date: Jul. 13, 1999
(87) PCT Pub. No.: WO98/23557
PCT Pub. Date: Jun. 4, 1998

(30) Foreign Application Priority Data

Nov. 25, 1996 (JP) .............................................. 8-328023

(51) Int. Cl.⁷ .......................... C01B 17/00; C01B 21/00; C05C 11/00; C05D 9/00
(52) U.S. Cl. ........................... 71/61; 71/54; 204/157.3; 204/157.46; 204/157.49
(58) Field of Search .................. 204/157.3, 157.46, 204/157.49; 71/54, 61

(56) References Cited

U.S. PATENT DOCUMENTS

| | | | | |
|---|---|---|---|---|
| 4,294,674 A | * | 10/1981 | Aoki et al. | 204/157.46 |
| 5,041,271 A | * | 8/1991 | Aoki et al. | 204/157.46 |
| 5,244,552 A | | 9/1993 | Namba et al. | |
| 5,702,572 A | * | 12/1997 | Fujimura et al. | 204/157.46 |
| 5,834,722 A | | 11/1998 | Tokunaga et al. | |
| 6,093,288 A | * | 7/2000 | Izutsu et al. | 204/157.3 |

\* cited by examiner

*Primary Examiner*—Wayne Langel
(74) *Attorney, Agent, or Firm*—Oblon, Spivak, McClelland, Maier & Neustadt, P.C.

(57) ABSTRACT

The present invention relates to a method and an apparatus for producing a fertilizer by injecting ammonia into and applying electron beam to gas containing sulfur oxides. Gas containing sulfur oxides is cooled by a heat exchanger (2) and a cooling tower (3), and thereafter introduced into a process vessel (4) in which ammonia is injected into the gas and the gas is irradiated with electron beam. The product of the ratio of the concentration of ammonia to the concentration of water in the gas prior to irradiation of the electron beam and the ratio of the concentration of ammonia to the concentration of water in the gas after irradiation of the electron beam is controlled to be of a predetermined value.

12 Claims, 7 Drawing Sheets

METHOD FOR PRODUCING A FERTILIZER FROM GAS CONTAINING SULFUR OXIDES

TECHNICAL FIELD

The present invention relates to a method of producing a fertilizer, and more particularly to a method and an apparatus for producing a fertilizer by injecting ammonia into gas containing sulfur oxides and applying electron beam to the gas.

BACKGROUND ART

There has been developed a process of producing a fertilizer by introducing gas containing sulfur oxides, such as flue gas generated when fossil fuel is combusted (hereinafter referred to as "fossil fuel combustion flue gas"), into a process vessel, injecting ammonia into and applying electron beam to the gas in the process vessel to thereby produce a product that primarily comprises ammonium sulfate, which is a typical nitrogenous fertilizer, and collecting the product with a collector such as an electrostatic precipitator. According to the process of injecting ammonia into and applying electron beam to gas containing sulfur oxides such as fossil fuel combustion flue gas, an appreciable amount of ammonium sulfamate ($NH_4SO_3NH_2$) which is harmful to the growth of plant, is produced together with ammonium sulfate. In order to use the above product as a fertilizer, it has been necessary to remove ammonium sulfamate from the product which contains ammonium sulfamate, or to take a suitable measure to suppress the production of ammonium sulfamate.

One known process of removing ammonium sulfamate which is by-product is to heat the product. It is also known to suppress the production of ammonium sulfamate by mixing ammonia and water and spraying a mixture of ammonia and water into the process vessel.

The former process of heating the product needs an apparatus and a heat source for heating the product after the product has been collected. The latter process of spraying a mixture of ammonia and water into the process vessel is problematic in that it is impossible to suppress the production of ammonium sulfamate under all gas conditions and operating conditions to a level low enough to allow the product to be used as a fertilizer.

DISCLOSURE OF INVENTION

It is an object of the present invention to solve the problems in the conventional method and to provide a method and an apparatus for producing a fertilizer from gas containing sulfur oxides such as fossil fuel combustion flue gas, while suppressing production of ammonium sulfamate to a level low enough to use the product as a fertilizer, with a simple means without the use of an additional apparatus and a heat source, in a very wide range of gas conditions and operating conditions.

In order to achieve the above object, the inventors have studied in detail the mechanism by which ammonium sulfamate is produced in a process of injecting ammonia into and applying electron beam to gas containing sulfur oxides, as follows:

$SO_2$, which is a primary component of sulfur oxides contained in fossil fuel combustion flue gas or the like, is oxidized very quickly into $SO_3$ by active components including O radials, OH radicals and the like generated from oxygen molecules or water molecules in the gas when irradiated with the electron beam. This $SO_3$ reacts with ammonia to produce sulfamic acid according to the following formula (1):

$$SO_3 + NH_3 \rightarrow HSO_3NH_2 \quad (1)$$

The fossil fuel combustion flue gas originally contains a small amount of $SO_3$ as well as $SO_2$. This $SO_3$ changes into sulfamic acid according to the formula (1), without being irradiated with the electron beam.

$SO_3$ also reacts with water contained in the gas and changes into sulfuric acid according to the following formula (2):

$$SO_3 + H_2O \rightarrow H_2SO_4 \quad (2)$$

The ratio $R_1$ of the proportion of the sulfur oxides, contained in the fossil fuel combustion flue gas or the like, which have changed into sulfamic acid to the proportion of the sulfur oxides which have changed into sulfuric acid is determined by the ratio ($=[NH_3]in/[H_2O]in$) of the concentration of ammonia ($[NH_3]in$) to the concentration of water ($[H_2O]in$) in the gas prior to irradiation of the electron beam. As the ratio $[NH_3]in/[H_2O]in$ is smaller, the proportion of the sulfur oxides which change into sulfamic acid is smaller. This is because the reaction rate $v_1$ of the formula (1) and the reaction rate $v_2$ of the formula (2) are calculated from respective chemical reaction rate constants $k_1$, $k_2$, the concentration of $SO_3$ ($[SO_3]$) in the gas immediately after $SO_2$ changes into $SO_3$ by irradiation of the electron beam, the concentration of ammonia ($[NH_3]in$) and the concentration of water ($[H_2O]in$) in the gas prior to the start of the reactions represented by the formulas (1), (2), according to the following formulas (A1), (A2), because the concentrations prior to the start of the reaction represented by the formulas (1), (2) are equal to the concentrations prior to irradiation of the electron beam:

$$v_1 = k_1 \times [SO_3] \cdot [NH_3]in \quad (A1)$$

$$v_2 = k_2 \times [SO_3] \cdot [H_2O]in \quad (A2)$$

A portion of the sulfamic acid generated according to the formula (1) reacts again with ammonia according to the following formula (3) to produce ammonium sulfamate, and a portion of the sulfamic acid reacts with water contained in the gas according to the following formula (4) and is hydrolyzed into sulfuric acid and ammonia:

$$HSO_3NH_2 + NH_3 \rightarrow NH_4SO_3NH_2 \quad (3)$$

$$HSO_3NH_2 + H_2O \rightarrow H_2SO_4 + NH_3 \quad (4)$$

The sulfuric acid generated according to the formulas (2), (4) reacts with the ammonia in the gas or the ammonia generated according to the formula (4), according to the following formula (5), and is neutralized into ammonium sulfate:

$$H_2SO_4 + 2NH_3 \rightarrow (NH_4)_2SO_4 \quad (5)$$

The successive reactions represented by the formulas (1) through (5) are illustrated in FIG. 7.

The generation of $SO_3$ by irradiation of the electron beam, and the subsequent reactions according to the formulas (1), (2) proceed very quickly, and are completed in less than 1 second after irradiation of the electron beam. On the other hand, the reactions according to the formulas (3), (4) which involve sulfamic acid are relatively slow, and are completed within a time of an order ranging from several seconds to several tens of seconds. Therefore, these reactions proceed primarily after the reactions according to the formulas (1), (2) are completed by irradiation of the electron beam until the product is collected by a collector such as an electrostatic precipitator and the gas is discharged out of the system. Therefore, the ratio $R_2$ of the proportion of the sulfamic acid, produced immediately after irradiation of the electron beam according to the formula (1), which has changed into the ammonium sulfamate according to the formula (3), to the proportion of the sulfamic acid which has changed into the ammonium sulfate according to the formulas (4), (5) is determined by the ratio (=[NH$_3$]out/[H$_2$O]out) of the concentration of ammonia ([NH$_3$]out) to the concentration of water ([H$_2$O]out) in the gas after irradiation of the electron beam. As the ratio [NH$_3$]out/[H$_2$O]out is smaller, the proportion of the sulfamic acid which changes into ammonium sulfamate is smaller. This is because the reaction rate $v_3$ of the formula (3) and the reaction rate $v_4$ of the formula (4) are calculated from respective chemical reaction rate constants $k_3$, $k_4$, the concentration of sulfamic acid ([HSO$_3$NH$_2$]), the concentration of ammonia ([NH$_3$]out) and the concentration of water ([H$_2$O]out) in the gas immediately after irradiation of the electron beam and the completion of the reactions represented by the formulas (1), (2), according to the following formulas (A3), (A4):

$$v_3 = k_3 \times [HSO_3NH_2] \cdot [NH_3]out \quad (A3)$$

$$v_4 = k_4 \times [HSO_3NH_2] \cdot [H_2O]out \quad (A4)$$

Since the reactions represented by the formulas (1), (2) proceed very rapidly, a state achieved after irradiation of the electron beam and the completion of the reactions represented by the formulas (1), (2) may practically be regarded as a state achieved after irradiation of the electron beam.

The ratio R of the ammonium sulfamate to the ammonium sulfate in the final product is equal to the product of the ratio $R_1$ of the proportion of the sulfur oxides, contained in the fossil fuel combustion flue gas or the like, which have changed into sulfamic acid to the proportion of the sulfur oxides which have changed into sulfuric acid, and the ratio $R_2$ of the proportion of the produced sulfamic acid which has changed into ammonium sulfamate to the proportion of the produced sulfamic acid which has changed into ammonium sulfate, as expressed by the following formula (6):

$$R = R_1 \times R_2 \quad (6)$$

The ratio $R_1$ is a function of the ratio [NH$_3$]in/[H$_2$O]in and is smaller as the ratio [NH$_3$]in/[H$_2$O]in is smaller. The ratio $R_2$ is a function of the ratio [NH$_3$]out/[H$_2$O]out and is smaller as the ratio [NH$_3$]out/[H$_2$O]out is smaller. The inventors have thus found that the ratio R of the ammonium sulfamate to the ammonium sulfate in the product is a function of [NH$_3$]in/[H$_2$O]in and [NH$_3$]out/[H$_2$O]out and is smaller as both [NH$_3$]in/[H$_2$O]in and [NH$_3$]out/[H$_2$O]out are smaller.

Generally, in the fossil fuel combustion flue gas, the concentration of water ([H$_2$O]in) prior to irradiation of the electron beam is in the range of about 1 to 30%, the concentration of sulfur oxides ([SO$_x$]in) is in the range of about 10 to 10000 ppm, and the concentration of nitrogen oxides ([NO$_x$]in) is in the range of about 10 to 500 ppm. When gas containing sulfur oxides, such as fossil fuel combustion flue gas, under the above concentration conditions, is introduced into a process vessel, and ammonia is injected into and electron beam is applied to the gas in the process vessel, the sulfur oxides are converted mainly into ammonium sulfate, and the nitrogen oxides are converted mainly into ammonium nitrate, with the injected ammonia partly remaining unreacted in the gas. The concentration of ammonia ([NH$_3$]in) injected into the gas in the process vessel when the gas is to be irradiated with the electron beam and the concentration of ammonia ([NH$_3$]out) remaining in the gas after irradiation of the electron beam have the relationship expressed by the following formula (7):

$$[NH_3]in = 2[SO_x]in \times (\eta_{SOx}/100) + [NO_x]in \times (\eta_{NOx}/100) + [NH_3]out \quad (7)$$

where $\eta_{SOx}$ represents a sulfur oxides conversion efficiency achieved by irradiation of the electron beam, and $\eta_{NOx}$ represents a nitrogen oxides conversion efficiency achieved by irradiation of the electron beam. The sulfur oxides conversion efficiency $\eta_{SOx}$ and the nitrogen oxides conversion efficiency $\eta_{NOx}$ are typically in the respective ranges of about 80 to 99% and 70 to 90%.

The inventors repeated an experiment to produce a product mainly composed of ammonium sulfate from gas containing sulfur oxides, using an apparatus shown in FIG. 1. As shown in FIG. 1, combustion flue gas discharged from a boiler 1 was cooled by a heat exchanger 2, cooled by a water spray cooling tower 3 with the heat of vaporization of water, and introduced into a process vessel 4. Ammonia supplied from an ammonia supply facility 9 was mixed with air in a line mixer 10. The mixed gas was then mixed with industrial water in a gas-liquid mixing chamber in a two-fluid nozzle 11, and the mixture was sprayed into the process vessel 4 at its inlet. The mixture in the process vessel 4 was irradiated with electron beam of 8 kGy from an electron accelerator 8. The gas had a temperature of 65° C. at the outlet of the process vessel 4, and was introduced into an electrostatic precipitator 6, which collected a product from the gas. Thereafter, the gas was increased in pressure by an induced draft fan 7 and discharged into the atmosphere.

In the experiment, different types of fossil fuels were combusted in the boiler 1 to change the concentration of water, the concentration of sulfur oxides, and the concentration of nitrogen oxides prior to irradiation of the electron beam in the above respective ranges. Specifically, the concentration of water in the flue gas was changed in the range from 1 to 30%, the concentration of sulfur oxides from 10 to 10000 ppm, and the concentration of nitrogen oxides from 10 to 500 ppm. The concentration of water prior to irradiation of the electron beam was also changed by changing the temperature of the flue gas at the outlet of the heat exchanger 2 and the amount of vaporized water in the water spray cooling tower 3. The concentration of ammonia after irradiation of the electron beam was changed in a range which does not exceed 1000 ppm by changing the amount of ammonia supplied from the ammonia supply facility 9. The product collected by the electrostatic precipitator 6 was sampled at each of various operating conditions, and measured for the concentration of sulfuric acid ions and the concentration of sulfamic acid ions to thereby calculate the ratio R of ammonium sulfamate to ammonium sulfate in the product.

As a result, the inventors have found that in the above wide range of gas conditions, the ratio R of ammonium sulfamate to ammonium sulfate is determined by a simple ratio $r_A$ expressed by the following formula (8):

$$r_A = ([NH_3]in/[H_2O]in) \times ([NH_3]out/[H_2O]out) \quad (8)$$

FIG. 2 shows the experimentally obtained relationship between R and $r_A$. In FIG. 2, the horizontal axis represents $r_A$ and the vertical axis represents R. If R is about 0.01% or less, then the product can be used as a fertilizer without any problem. According to the process of injecting ammonia into and applying electron beam to fossil fuel combustion flue gas in the above ranges of gas concentration conditions, the concentration of water in the gas remains substantially unchanged before and after irradiation of the electron beam unless water is sprayed after irradiation of the electron beam. Because of $[H_2O]in=[H_2O]out$, the above formula (8) can be modified into the following formula (8'):

$$r_A=([NH_3]in\cdot[NH_3]out)/([H_2O]in)^2 \qquad (8'),$$

In order to solve the problems in the conventional method, the inventors have developed a process of suppressing the ratio $r_A$ calculated according to the formula (8) or (8') to $1.5\times10^{-5}$ or less, preferably $7.5\times10^{-6}$ or less, for thereby keeping the concentration of ammonium sulfamate in the product to a sufficiently low level by adjusting the concentration of water $[H_2O]in$ in the gas prior to irradiation of the electron beam, and/or the concentration of water $[H_2O]out$ in the gas after irradiation of the electron beam, and/or the concentration of ammonia $[NH_3]in$ prior to irradiation of the electron beam, and/or the concentration of ammonia $[NH_3]$ out after irradiation of the electron beam.

Of the above variables, the concentration of water in the gas prior to irradiation of the electron beam can be increased by injecting water into the gas containing sulfur oxides. The process of injecting ammonia into and applying electron beam to the gas containing sulfur oxides is characterized in that the conversion efficiency of the sulfur oxides is higher as the temperature of the gas is lower. Usually, the temperature of the gas is adjusted to a temperature of about 50 to 80° C. before irradiation of the electron beam. If the gas is cooled by the heat of vaporization of water injected into the gas, then the temperature of the gas can be adjusted, and the ratio $r_A$ can be held to $1.5\times10^{-5}$ or less, preferably $7.5\times10^{-6}$ or less, by increasing the concentration of water in the gas before irradiation of the electron beam. It is also possible to reduce the ratio $r_A$ by injecting water into the gas after irradiation of the electron beam for thereby increasing the concentration of water in the gas after irradiation of the electron beam. However, if water is instead injected into the gas before irradiation of the electron beam, then both the concentration of water in the gas after irradiation of the electron beam and the concentration of water in the gas before irradiation of the electron beam can be increased, resulting in a process which is more effective to lower the ratio $r_A$. Therefore, it is preferable to inject water into the gas containing sulfur oxides before the gas is irradiated with the electron beam.

Water may be injected into the gas prior to irradiation of the electron beam by a gas cooling apparatus which brings the gas and water into direct contact with each other upstream of the process vessel to vaporize water in the gas for thereby cooling the gas with the heat of vaporization of water, a water spraying apparatus positioned at the inlet of the process vessel for spraying water into the gas, or a combination of the gas cooling apparatus and the water spraying apparatus. Water may be sprayed at the inlet of the process vessel by injecting water and ammonia separately, or spraying a mixture of water and ammonia gas or ammonia-mixed air with a two-fluid nozzle, or spraying aqueous ammonia.

The concentrations of ammonia in the gas before and after irradiation of the electron beam have the relationship represented by the above formula (7), and may be lowered by reducing the amount of ammonia injected into the gas containing sulfur oxides. If, however, the concentration of sulfur oxides, the concentration of nitrogen oxides, the sulfur oxides conversion efficiency, and the nitrogen oxides conversion efficiency before irradiation of the electron beam are of given values, then the concentration of ammonia prior to irradiation of the electron beam cannot be lower than a theoretical requisite concentration expressed by the following formula (7'):

$$\text{Theoretical requisite concentration of ammonia}=2[SO_x]in\times(\eta_{SOx}/100)+[NO_x]in\times(\eta_{NOx}/100) \qquad (7')$$

The concentration of ammonia after irradiation of the electron beam can be adjusted with large freedom. It therefore is highly effective to hold the ratio $r_A$ to $1.5\times10^{-5}$ or less, preferably $7.5\times10^{-6}$ or less, by reducing the concentration of ammonia in the gas after irradiation of the electron beam.

The inventors have also found that if the concentration of ammonia $([NH_3]out)$ in the gas after irradiation of the electron beam were excessively reduced, the sulfur oxides conversion efficiency would be greatly lowered. A further study conducted by the inventors has indicated that if the ratio $r_B$ calculated by the formula (9) given below is less than $1\times10^{-4}$, then the sulfur oxides conversion efficiency is greatly lowered. In contrast thereto, the sulfur oxides conversion efficiency is not greatly lowered if the ratio $r_B$ is equal to or greater than $1\times10^{-4}$.

FIG. 3 shows the relationship between the sulfur oxides conversion efficiency and the ratio $r_B$. In FIG. 3, the horizontal axis represents $r_B$, and the vertical axis represents sulfur oxides conversion efficiency. Experimental results shown in FIG. 3 were obtained by using the apparatus shown in FIG. 1 under the same gas conditions, including the concentrations of water, sulfur oxides, and nitrogen oxides in the flue gas and the temperature of ammonia after irradiation of the electron beam, as those in the experiment conducted to obtain the results shown in FIG. 2, with the same electron beam dose and process vessel outlet temperature as those in the experiment conducted to obtain the results shown in FIG. 2. It can be seen from FIG. 3 that the sulfur oxides conversion efficiency is greatly reduced if the ratio $r_B$ is less than $1\times10^{-4}$.

$$r_B=[NH_3]out/(2[SO_x]in+[NO_x]in) \qquad (9)$$

By adjusting the concentration of ammonia in the gas after irradiation of the electron beam to hold the ratio $r_A$ to $1.5\times10^{-5}$ or less, preferably $7.5\times10^{-6}$ or less and the ratio $r_B$ to $1\times10^{-4}$ or more, it is possible to reduce the concentration of ammonium sulfamate in the product without lowering the sulfur oxides conversion efficiency.

The concentration of ammonia in the gas after irradiation of the electron beam can be adjusted easily by adjusting the amount of ammonia to be injected into the gas. The amount of ammonia to be injected into the gas may be adjusted by a "feedback control process" which adjusts the amount of ammonia based on a measured value of the concentration of ammonia in the gas after irradiation of the electron beam, or a "feed-forward and feedback control process" which is a combination of the above feedback control process and a feed-forward control process which adjusts the amount of ammonia based on measured values of gas conditions prior to irradiation of the electron beam, target values of the sulfur oxides conversion efficiency and the nitrogen oxides conversion efficiency, and a target value of the concentration of ammonia.

In order to minimize the concentration of ammonia in the gas after irradiation of the electron beam insofar as the ratio $r_B$ is not below $1\times10^{-4}$, an ammonia injection control system including a plurality of ammonia injection control devices may be provided, with at least one of the ammonia injection control devices being capable of injecting a trace amount of ammonia. With such an arrangement, it is not necessary to employ an ammonia injection control system which is capable of adjusting the concentration of ammonia with extremely high accuracy.

The concentration of ammonia in the gas after irradiation of the electron beam may be reduced by increasing the dose of the electron beam or lowering the temperature of the gas when the gas is irradiated with the electron beam to increase the sulfur oxides conversion efficiency, rather than by adjusting the amount of ammonia to be injected into the gas. By using these variables in the control process, the concentration of ammonia in the gas after irradiation of the electron beam can be adjusted more effectively. Specifically, when the gas conditions prior to irradiation of the electron beam vary to shift the dose of the electron beam and/or the temperature of the gas at the outlet of the process vessel from their appropriate values, if only the amount of ammonia to be injected into the gas is reduced in an attempt to reduce the concentration of ammonia in the gas after irradiation of the electron beam, then the sulfur oxides conversion efficiency will abruptly be lowered. Therefore, when the gas conditions prior to irradiation of the electron beam vary, not only the amount of ammonia to be injected into the gas, but also the dose of the electron beam and/or the temperature of the gas at the outlet of the process vessel should preferably be adjusted at the same time. For such adjustments, it is possible to employ a "feedback control process" which adjusts the amount of ammonia to be injected and/or the dose of the electron beam and/or the temperature of the gas at the outlet of the process vessel based on a measured value of the concentration of ammonia in the gas after irradiation of the electron beam, and a measured value of the concentration of remaining sulfur oxides in the gas after irradiation of the electron beam, or a "feed-forward and feedback control process" which is a combination of the above feedback control process and a feed-forward control process which adjusts the amount of ammonia to be injected and/or the dose of the electron beam and/or the temperature of the gas at the outlet of the process vessel based on measured values of gas conditions prior to irradiation of the electron beam, target values of the sulfur oxides conversion efficiency and the nitrogen oxides conversion efficiency, and a target value of the concentration of ammonia.

Strictly, the concentration of ammonia in the gas after irradiation of the electron beam gradually decreases due to the reactions represented by the formula (3), the formula (4), and the formula (5) which involves ammonia produced according to the formula (4). However, since the concentration of sulfamic acid produced according to the formula (1) is usually much smaller than the concentration of ammonia immediately after the gas is irradiated with the electron beam and the reactions represented by the formulas (1), (2) are completed, the concentration of ammonia in the gas after irradiation of the electron beam in the ammonia injection control process may be measured anywhere from the outlet of the process vessel to the point where the processed gas is discharged into the atmosphere.

If the collector for collecting the product comprises an apparatus such as a bag filter for retaining the product therein and collecting the product from the gas by passing the gas after irradiation of the electron beam through a retained layer which contains the product, then because $SO_2$ which does not change into $SO_3$ by irradiation of the electron beam, but remains in the gas, reacts with ammonia on the surface of the retained product according to the formula (10) shown below, the concentration of ammonia in the gas may greatly differ before and after the collector.

$$SO_2 + 2NH_3 + (1/2)O_2 + H_2O \rightarrow (NH_4)_2SO_4 \qquad (10)$$

Therefore, if the product collector of the above type is employed, then the concentration of ammonia in the gas upstream of the product collector has to be measured for controlling the injection of ammonia. If an electrostatic precipitator which is different from the product collector of the above type is employed, then the concentration of ammonia in the gas may be measured downstream of the electrostatic precipitator for controlling the injection of ammonia.

BEST MODE FOR CARRYING OUT THE INVENTION

Best modes for carrying out the invention will be described in specific detail below.

(Embodiment 1)

Figure 1:
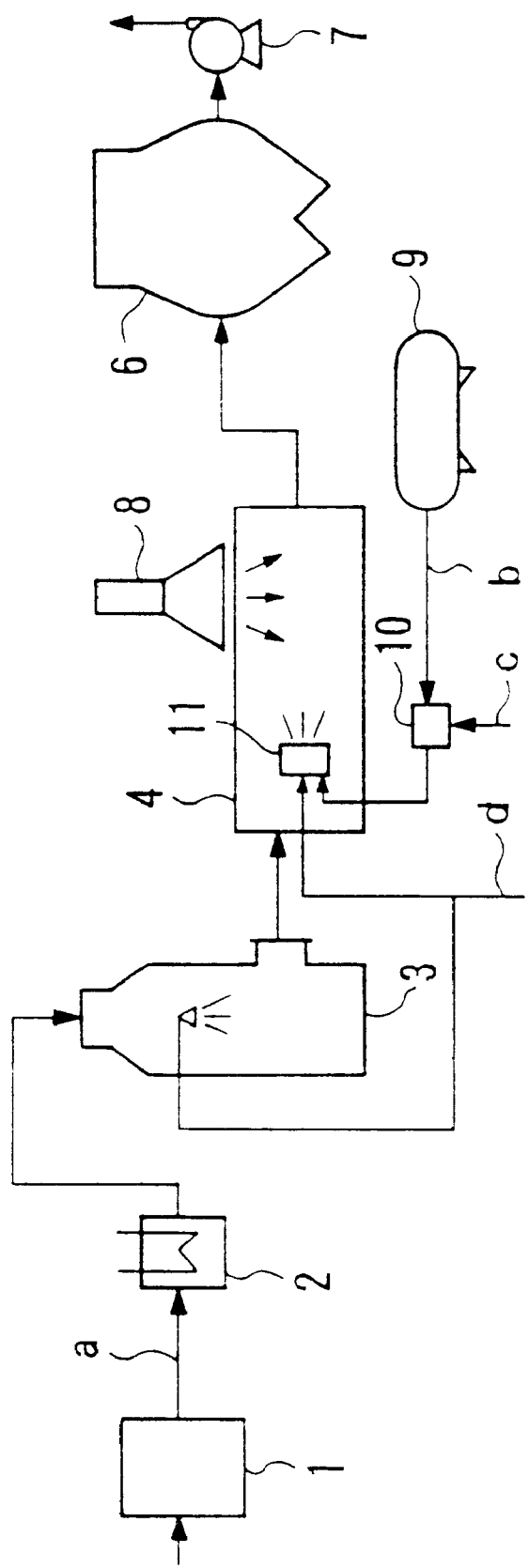
FIG. 1 is a diagram of an overall arrangement of an apparatus for producing a fertilizer according to an embodiment of the present invention.
Figure 2:
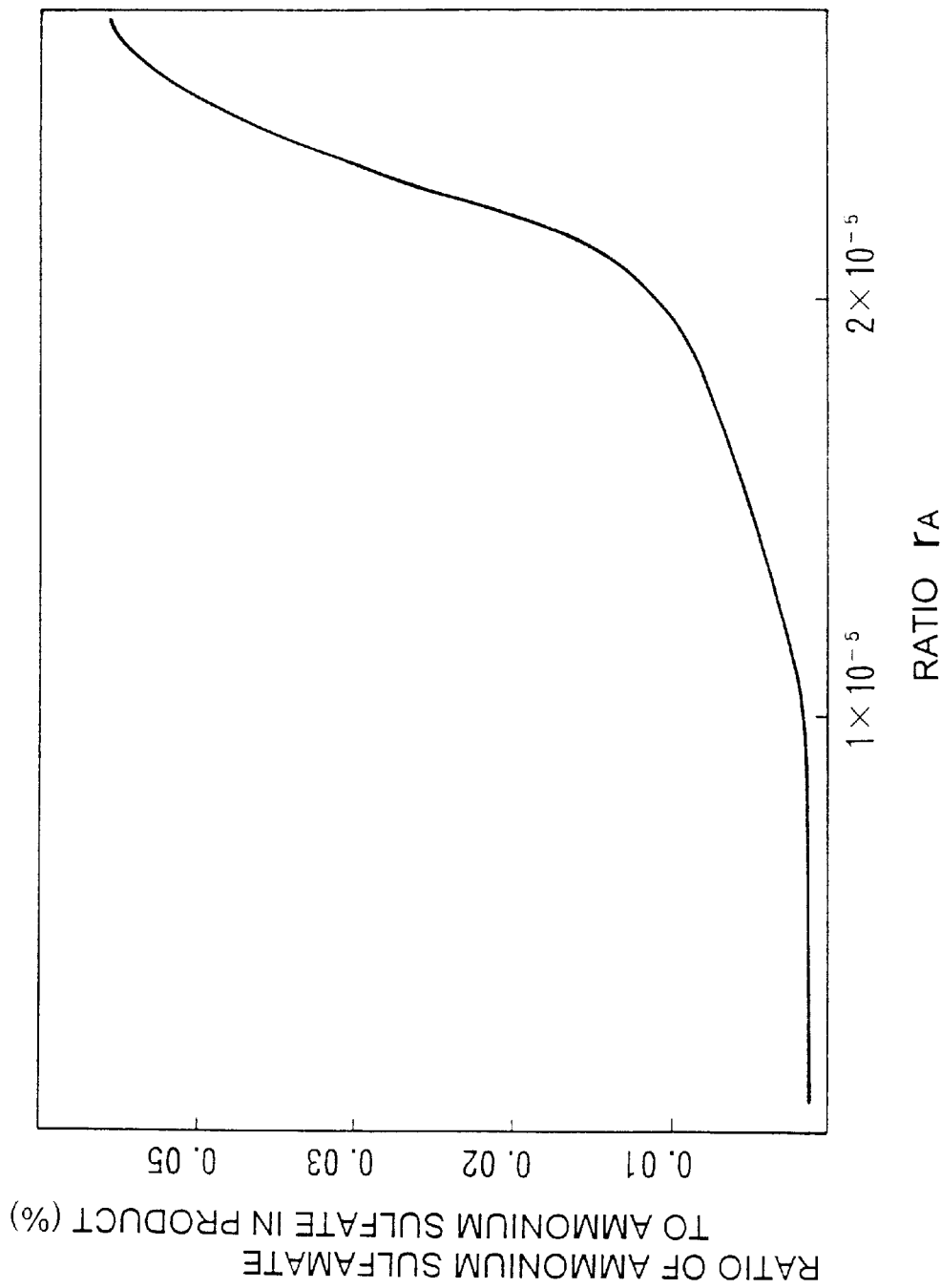
FIG. 2 is a graph showing the relationship between a ratio R of ammonium sulfamate to ammonium sulfate in a product and a ratio $r_A$.
Figure 3:
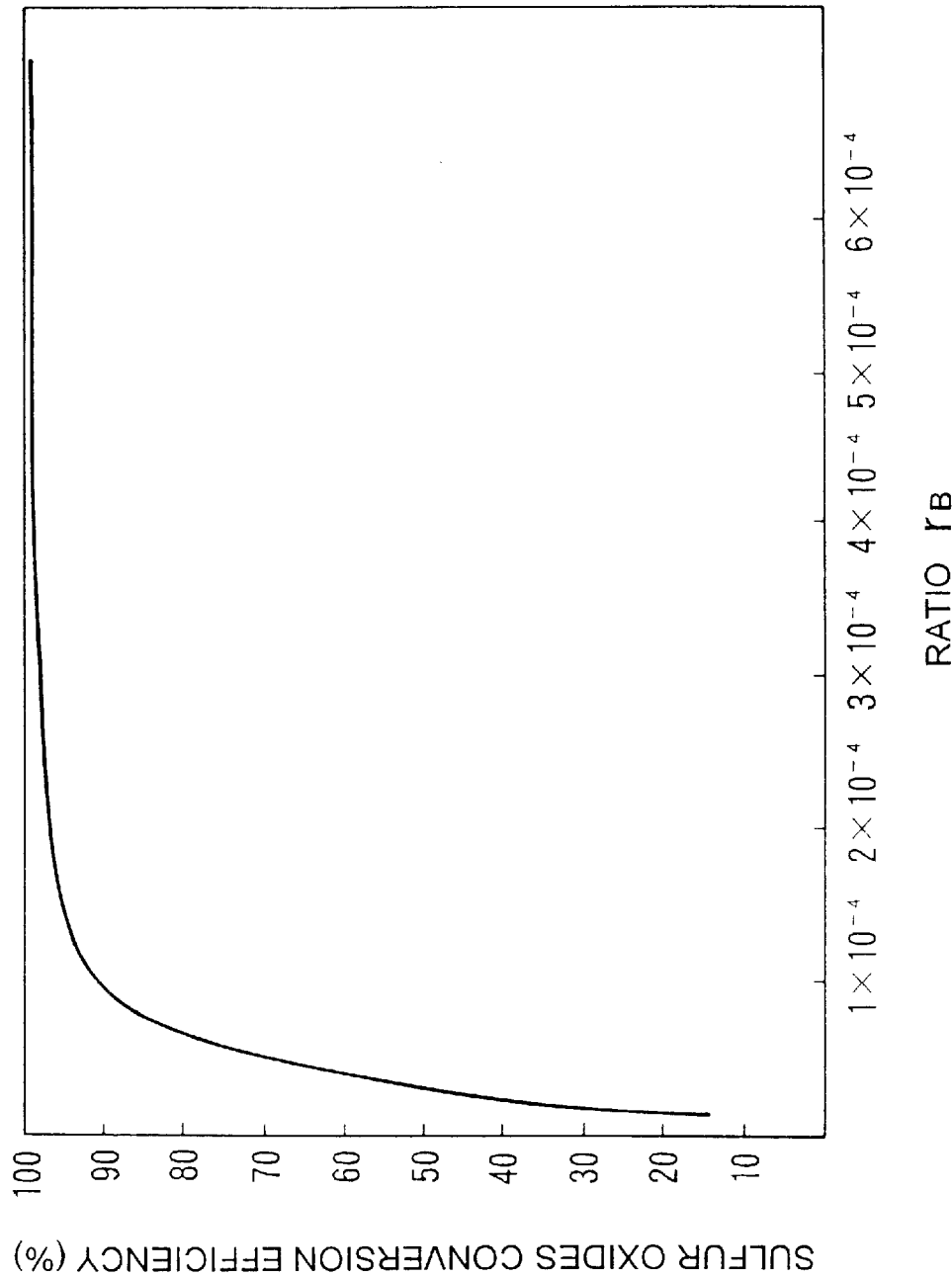
FIG. 3 is a graph showing the relationship between a sulfur oxides conversion efficiency and a ratio $r_B$.

FIG. 1 is a diagram of an overall arrangement of an apparatus for producing a fertilizer according to an embodiment of the present invention.

In FIG. 1, flue gas a of 1500 m³N/h generated from a boiler 1, which contained 6% of water, 700 ppm of sulfur oxides, and 150 ppm of nitrogen oxides, was cooled to 150° C. by a heat exchanger 2, then cooled to 60° C. by a water spray cooling tower 3, and thereafter introduced into a process vessel 4. Ammonia b supplied from an ammonia supply facility 9 was mixed with air c of 7.0 m³N/h in a line mixer 10. The mixed gas from the line mixer 10 and industrial water d of 11 kg/h were mixed with each other in a gas-liquid mixing chamber in a two-fluid nozzle 11, and the mixture was sprayed into the process vessel 4 at its inlet. The mixture in the process vessel 4 was irradiated with electron beam of 500 keV at 16 mA from an electron accelerator 8. Before the mixture was irradiated with the electron beam, the concentration of water in the gas increased to 12%. The flue gas a, which had a temperature of 65° C. at the outlet of the process vessel 4, was introduced into an electrostatic precipitator 6. After a product was collected from the flue gas by the electrostatic precipitator 6, the flue gas was increased in pressure by an induced draft fan 7 and discharged into the atmosphere.

When the amount of ammonia b supplied from the ammonia supply facility 9 was changed in a range from 2.00 m³N/h to 2.10 m³N/h, the concentration of ammonia remaining in the gas at the outlet of the induced draft fan 7 changed in a range from 1 ppm to 30 ppm. The ratio $r_A$ calculated according to the formula (8) was $7.5 \times 10^{-6}$ or less, and the ratio $r_B$ calculated according to the formula (9) was $1 \times 10^{-4}$ or greater. The concentration of sulfur oxides at the outlet of the induced draft fan 7 changed in a range from 25 ppm to 55 ppm. The concentration of nitrogen oxides at the outlet of the induced draft fan 7 was 30 ppm and remained unchanged, and the concentration of the dust was 5 mg/m³N and remained unchanged.

The product collected by the electrostatic precipitator 6 was sampled at each of the various conditions of the concentration of remaining ammonia, and the ratios R of ammonium sulfamate to ammonium sulfate in the product were calculated for the respective conditions. All of the calculated ratios R were about 0.001% which is a level low enough to be able to use the product as a fertilizer. The conversion efficiency for the sulfur oxides was 90% or higher, and hence had a sufficiently high level.

(Embodiment 2)

Figure 4:
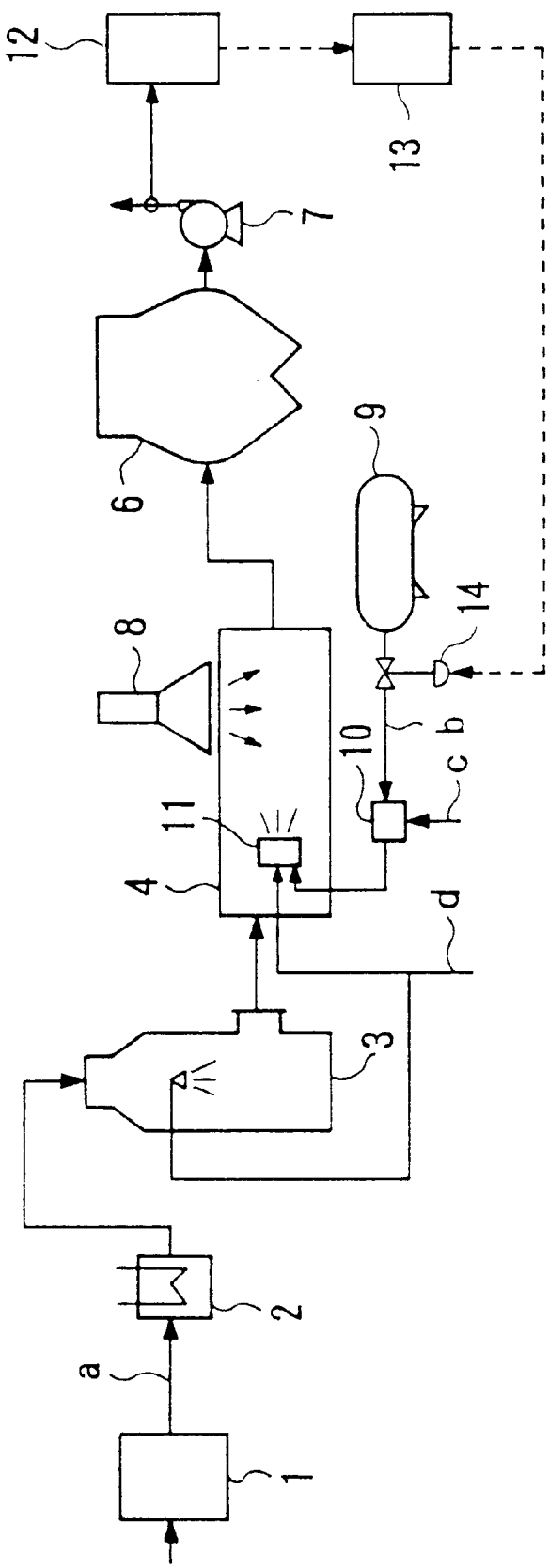
FIG. 4 is a diagram of an overall arrangement of an apparatus for producing a fertilizer according to another embodiment of the present invention.

FIG. 4 is a diagram of an overall arrangement of an apparatus for producing a fertilizer according to another embodiment of the present invention.

In FIG. 4, flue gas a generated from a boiler 1 contained 6% of water and 150 ppm of nitrogen oxides, and contained sulfur oxides whose concentration varied in a range from 500 ppm to 1500 ppm, and had a flow rate which varied in a range from 1000 m³N/h to 2500 m³N/h. The gas a was cooled to 150° C. by a heat exchanger 2, then cooled to 60° C. by a water spray cooling tower 3, and thereafter introduced into a process vessel 4. Ammonia b supplied from an ammonia supply facility 9 was mixed with air c of 7.0 m³N/h in a line mixer 10. The mixed gas from the line mixer 10 and industrial water d of 11 kg/h were mixed with each other in a gas-liquid mixing chamber in a two-fluid nozzle 11, and the mixture was sprayed into the process vessel 4 at its inlet. The mixture in the process vessel 4 was irradiated with electron beam of 500 keV at 16 mA from an electron accelerator 8. Before the mixture was irradiated with the electron beam, the concentration of water in the gas increased to 12%. The flue gas was introduced into an electrostatic precipitator 6. After a product was collected from the flue gas by the electrostatic precipitator 6, the flue gas was increased in pressure by an induced draft fan 7 and discharged into the atmosphere.

The gas was sampled from the outlet of the induced draft fan 7, and measured for the concentration of ammonia by an ammonia analyzer 12. A measured signal from the ammonia analyzer 12 was sent to a controller 13, which performs PID control calculations in order to adjust the concentration of ammonia measured by the ammonia analyzer 12 to 20 ppm. A control signal produced as a result of the PID control calculations was sent to an ammonia flow rate regulating valve 14. Such a feedback control process regulated the amount of ammonia supplied from the ammonia supply facility 9 to control the concentration of ammonia at the outlet of the induced draft fan 7 to fall in a range of 20 ppm±5 ppm. The ratio $r_A$ was $7.5 \times 10^{-6}$ or less, and the ratio $r_B$ was $1 \times 10^{-4}$ or greater.

The product collected by the electrostatic precipitator 6 was sampled and analyzed each time the concentration of sulfur oxides in the flue gas from the boiler 1 and the rate of the flue gas changed, and the ratios R of ammonium sulfamate to ammonium sulfate in the product were calculated for the respective concentrations and flue gas rates. All of the calculated ratios R were about 0.001%. However, the concentration of sulfur oxides and the concentration of nitrogen oxides at the outlet of the induced draft fan 7 changed greatly. Particularly when the rate of the flue gas from the boiler 1 increased to 2500 m³N/h and the power of the electron beam absorbed per gas rate decreased, or the concentration of sulfur oxides in the flue gas from the boiler 1 increased to 1500 ppm to increase the heat of the reaction and hence the temperature at the outlet of the process vessel 4, the conversion efficiency for the sulfur oxides was lowered to 50% or less.

(Embodiment 3)

Figure 5:
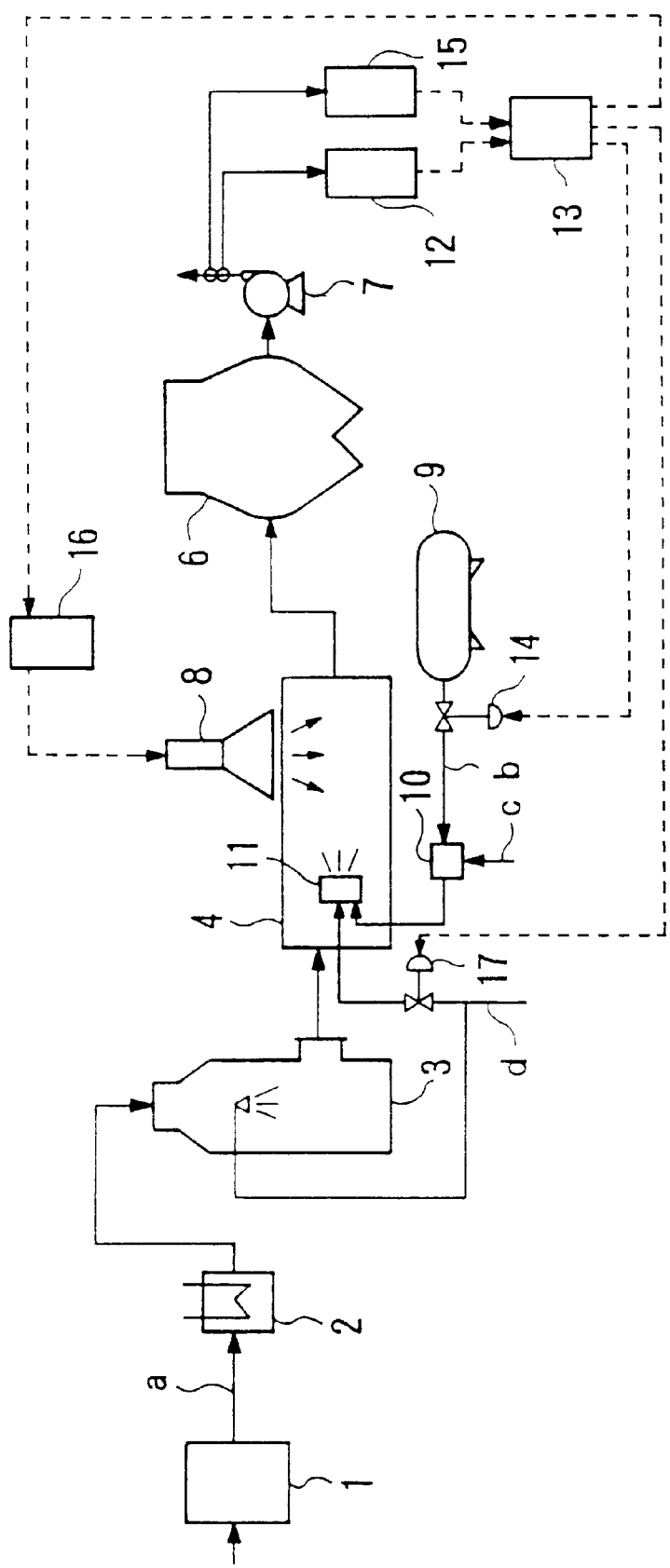
FIG. 5 is a diagram of an overall arrangement of an apparatus for producing a fertilizer according to still another embodiment of the present invention.

FIG. 5 is a diagram of an overall arrangement of an apparatus for producing a fertilizer according to still another embodiment of the present invention.

In FIG. 5, flue gas a generated from a boiler 1 contained 6% of water and 150 ppm of nitrogen oxides, and contained sulfur oxides whose concentration varied in a range from 500 ppm to 1500 ppm, and had a flow rate which varied in a range from 1000 m³N/h to 2500 m³N/h. The gas was cooled to 150° C. by a heat exchanger 2, then cooled to 60° C. by a water spray cooling tower 3, and thereafter introduced into a process vessel 4. Ammonia b supplied from an ammonia supply facility 9 was mixed with air c of 7.0 m³N/h in a line mixer 10. The mixed gas from the line mixer 10 and industrial water d were mixed with each other in a gas-liquid mixing chamber in a two-fluid nozzle 11, and the mixture was sprayed into the process vessel 4 at its inlet. The mixture in the process vessel 4 was irradiated with electron beam of 500 keV from an electron accelerator 8. The flue gas was introduced into an electrostatic precipitator 6. After a product was collected from the flue gas by the electrostatic precipitator 6, the flue gas was increased in pressure by an induced draft fan 7 and discharged into the atmosphere.

The gas was sampled from the outlet of the induced draft fan 7, and measured for the concentration of ammonia by an ammonia analyzer 12, and for the concentration of sulfur oxides by a sulfur oxides analyzer 15. Measured signals from the ammonia analyzer 12 and the sulfur oxides analyzer 15 were sent to a controller 13, which performed fuzzy control calculations in order to adjust the concentration of ammonia measured by the ammonia analyzer 12 to 20 ppm and also to adjust the concentration of sulfur oxides measured by the sulfur oxides analyzer 15 to 50 ppm. Control signals produced as a result of the fuzzy control calculations were sent to an ammonia flow rate regulating valve 14, an electron beam current controller 16, and a water flow rate regulating valve 17. Such a feedback control process regulated the amount of ammonia supplied from the ammonia supply facility 9, the dose of the electron beam, and the rate of sprayed water in the inlet of the process vessel 4 to control the concentration of ammonia at the outlet of the induced draft fan 7 to fall in a range of 20 ppm±5 ppm and also to control the concentration of sulfur oxides at the outlet of the induced draft fan 7 to fall in a range of 50 ppm±5 ppm. The ratio $r_A$ was $7.5 \times 10^{-6}$ or less, and the ratio $r_B$ was $1 \times 10^{-4}$ or greater.

The product collected by the electrostatic precipitator 6 was sampled and analyzed each time the concentration of sulfur oxides in the flue gas from the boiler 1 and the rate of the flue gas changed, and the ratios R of ammonium sulfamate to ammonium sulfate in the product were calculated for the respective concentrations and flue gas rates. All of the calculated ratios R were about 0.001%. It was possible to suppress variations of the sulfur oxides conversion efficiency.

(Embodiment 4)

Figure 6:
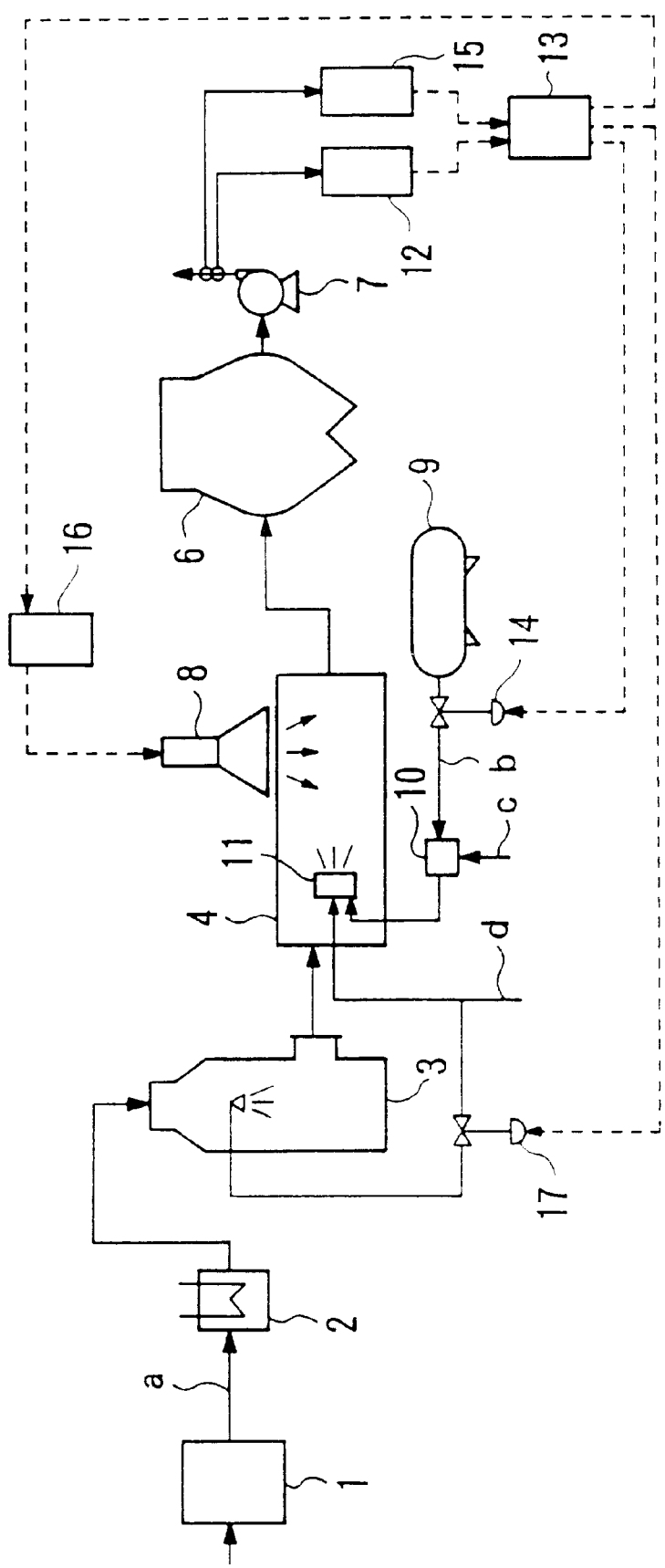
FIG. 6 is a diagram of an overall arrangement of an apparatus for producing a fertilizer according to yet another embodiment of the present invention.
Figure 7:
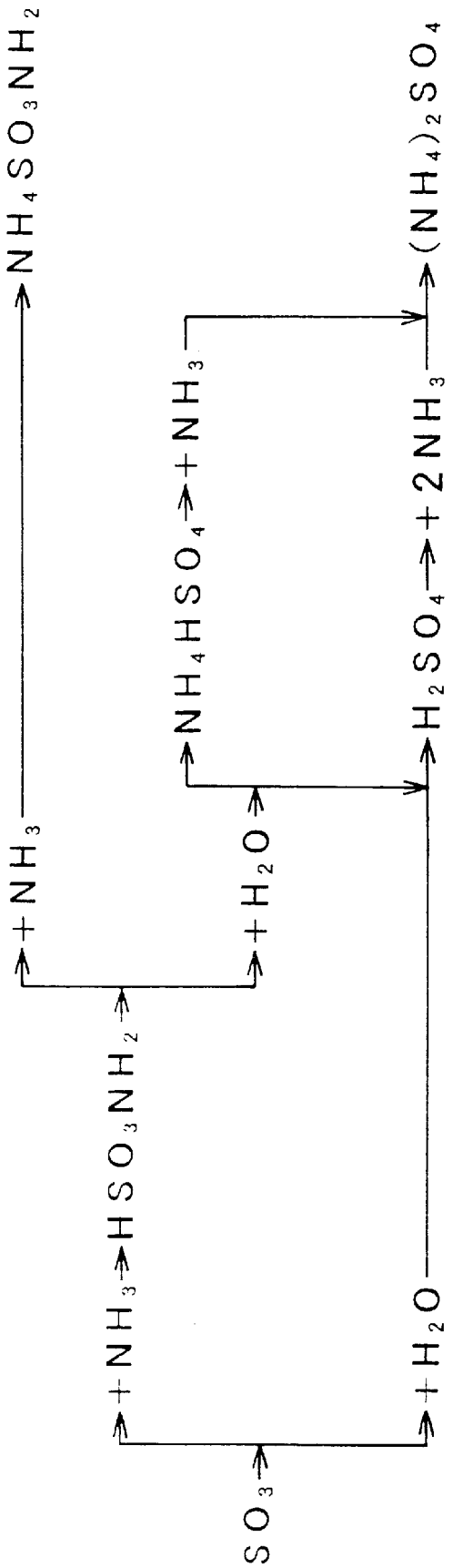
FIG. 7 is a diagram of successive reactions which occur when ammonia is injected into and electron beam is applied to gas containing sulfur oxides.

FIG. 6 is a diagram of an overall arrangement of an apparatus for producing a fertilizer according to still another embodiment of the present invention.

In FIG. 6, flue gas a generated from a boiler 1 contained 6% of water and 150 ppm of nitrogen oxides, and contained sulfur oxides whose concentration varied in a range from 500 ppm to 1500 ppm, and had a flow rate which varied in a range from 1000 m$^3$N/h to 2500 m$^3$N/h. The gas was cooled to 150° C. by a heat exchanger 2, then cooled by a water spray cooling tower 3, and thereafter introduced into a process vessel 4. Ammonia b supplied from an ammonia supply facility 9 was mixed with air c of 7.0 m$^3$N/h in a line mixer 10. The mixed gas from the line mixer 10 and industrial water d of 11 kg/h were mixed with each other in a gas-liquid mixing chamber in a two-fluid nozzle 11, and the mixture was sprayed into the process vessel 4 at its inlet. The mixture in the process vessel 4 was irradiated with electron beam of 500 keV from an electron accelerator 8. The flue gas was introduced into an electrostatic precipitator 6. After a product was collected from the flue gas by the electrostatic precipitator 6, the flue gas was increased in pressure by an induced draft fan 7 and discharged into the atmosphere.

The gas was sampled from the outlet of the induced draft fan 7, and measured for the concentration of ammonia by an ammonia analyzer 12, and for the concentration of sulfur oxides by a sulfur oxides analyzer 15. Measured signals from the ammonia analyzer 12 and the sulfur oxides analyzer 15 were sent to a controller 13, which performed fuzzy control calculations in order to adjust the concentration of ammonia measured by the ammonia analyzer 12 to 20 ppm and also to adjust the concentration of sulfur oxides measured by the sulfur oxides analyzer 15 to 50 ppm. Control signals produced as a result of the fuzzy control calculations were sent to an ammonia flow rate regulating valve 14, an electron beam current controller 16, and a water flow rate regulating valve 17. Such a feedback control process regulated the amount of ammonia supplied from the ammonia supply facility 9, the dose of the electron beam, and the temperature of the flue gas at the outlet of the cooling tower 3 to control the concentration of remaining ammonia at the outlet of the induced draft fan 7 to fall in a range of 20 ppm±5 ppm and also to control the concentration of sulfur oxides at the outlet of the induced draft fan 7 to fall in a range of 50 ppm±5 ppm. The ratio $r_A$ was $7.5 \times 10^{-6}$ or less, and the ratio $r_B$ was $1 \times 10^{-4}$ or greater.

The product collected by the electrostatic precipitator 6 was sampled and analyzed each time the concentration of sulfur oxides in the flue gas from the boiler 1 and the rate of the flue gas changed, and the ratios R of ammonium sulfamate to ammonium sulfate in the product were calculated for the respective concentrations and flue gas rates. All of the calculated ratios R were about 0.001%. It was possible to suppress variations of the sulfur oxides conversion efficiency.

According to the present invention, the product $\{r_A = ([NH_3]in/[H_2O]in) \times ([NH_3]out/[H_2O]out)\}$ of the ratio $[NH_3]in/[H_2O]in$ of the concentration of ammonia to the concentration of water in the gas prior to irradiation of the electron beam and the ratio $[NH_3]out/[H_2O]out$ of the concentration of ammonia to the concentration of water in the gas after irradiation of the electron beam is controlled to be equal to or less than $1.5 \times 10^{-5}$, preferably equal to or less than $7.5 \times 10^{-6}$. The ratio $\{r_B = [NH_3]out/(2[SO_x]in + [NO_x]in)\}$ of the concentration of ammonia in the gas after irradiation of the electron beam to the sum of a value which is twice the concentration of sulfur oxides and the concentration of nitrogen oxides in the gas prior to irradiation of the electron beam is controlled to be equal to or greater than $1 \times 10^{-4}$. Such ratio control can be achieved by controlling the concentration of remaining ammonia in the gas after irradiation of the electron beam to fall in a range from 1 ppm to 30 ppm. It is possible to control the amount of produced ammonium sulfamate to be of a requisite level sufficiently low enough to allow the product to be used as a nitrogenous fertilizer without greatly lowering the sulfur oxides conversion efficiency.

INDUSTRIAL APPLICABILITY

The present invention is applicable to a system for producing a fertilizer by injecting ammonia into and applying electron beam to gas containing sulfur oxides such as flue gas generated when fossil fuel is combusted.

What is claimed is:

1. A method of producing a fertilizer from gas containing sulfur oxides, comprising:

injecting ammonia into said gas;

irradiating said gas with an electron beam; and collecting a product;

wherein a product $\{r_A = ([NH_3]in/[H_2O]in) \times ([NH_3]out/[H_2O]out)\}$ of the ratio $[NH_3]in/[H_2O]in$ of a concentration of ammonia to a concentration of water in the gas prior to said irradiating with said electron beam and the ratio $[NH_3]out/[H_2O]out$ of a concentration of ammonia to a concentration of water in the gas after irradiation of the electron beam is controlled to be equal to or less than $1.5 \times 10^{-5}$.

2. The method according to claim 1, wherein said product $r_A$ is $7.5 \times 10^{-6}$ or less.

3. The method according to claim 1, wherein said sulfur oxide is converted to sulfamic acid and sulfuric acid.

4. The method according to claim 3, wherein at least a portion of said sulfamic acid reacts with said ammonia to produce ammonium sulfamate.

5. The method according to claim 1, wherein said gas has a temperature of from 50 to 80° C. before said irradiating with said electron beam.

6. The method according to claim 1, wherein said product comprises ammonium sulfamate and ammonium sulfate.

7. The method according to claim 6, wherein a ratio of said ammonium sulfamate to said ammonium sulfate is about 0.001%.

8. The method according to claim 1, wherein a ratio $\{r_B = [NH_3]out/(2[SO_x]in + [NO_x]in)\}$ of the concentration of ammonia in the gas after said irradiating with said electron beam to the sum of a value which is twice the concentration of sulfur oxides and the concentration of nitrogen oxides in the gas prior to irradiating with said electron beam is controlled to be equal to or greater than $1 \times 10^{-4}$.

9. A method according to claims 1 or 8, wherein a value of the ratio $r_A$ is controlled by adjusting at least one parameter selected from the group consisting of a concentration of water in the gas, an amount of injected ammonia, a dose of the electron beam, and a temperature of the gas when the gas is irradiated with the electron beam.

10. The method according to claim 9, wherein the concentration of water in the gas is adjusted by injecting water into the gas.

11. The method according to claim 10, wherein water is injected into the gas before the gas is irradiated with the electron beam.

12. A method according to claim 8, wherein the value of said ratio $r_B$ is controlled by adjusting the amount of injected ammonia.

* * * * *

UNITED STATES PATENT AND TRADEMARK OFFICE
CERTIFICATE OF CORRECTION

PATENT NO.    : 6,355,084 B1
DATED         : March 12, 2002
INVENTOR(S)   : Izutsu et al.

It is certified that error appears in the above-identified patent and that said Letters Patent is hereby corrected as shown below:

<u>Title page, Item [54] and Column 1, lines 1-2,</u>
The title should be:
-- [54]  METHOD AND APPARATUS FOR PRODUCING A FERTILIZER FROM GAS CONTAINING SULFUR OXIDES --

Signed and Sealed this

Tenth Day of December, 2002

JAMES E. ROGAN
*Director of the United States Patent and Trademark Office*